(No Model.)
H. GROVER.
SLIDING GATE.
No. 560,352. Patented May 19, 1896.
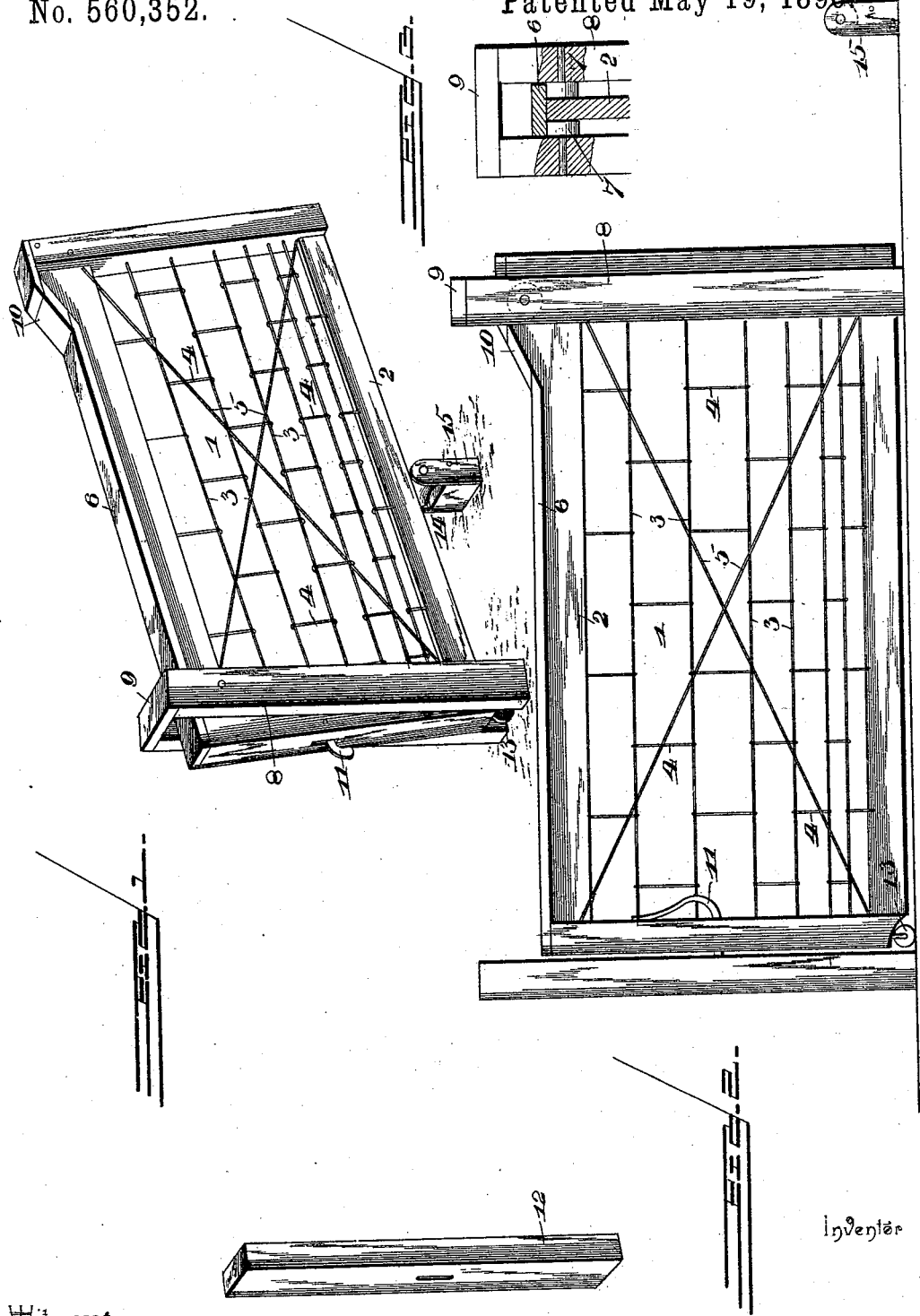
Witnesses
W. T. Doyle
J. F. Riley
Inventor
Harry Grover,
By C. A. Snow & Co. his Attorneys.

UNITED STATES PATENT OFFICE.

HARRY GROVER, OF OLLIE, IOWA.

SLIDING GATE.

SPECIFICATION forming part of Letters Patent No. 560,352, dated May 19, 1896.

Application filed July 9, 1895. Serial No. 555,363. (No model.)

*To all whom it may concern:*

Be it known that I, HARRY GROVER, a citizen of the United States, residing at Ollie, in the county of Keokuk and State of Iowa, have invented a new and useful Sliding Gate, of which the following is a specification.

The invention relates to improvements in gates.

The object of the present invention is to improve the construction of sliding gates, and to provide one which will be simple and inexpensive in construction, strong and durable, and adapted in opening to rise clear of obstructions, such as snow or the like, whereby its opening will not be impeded by the same.

The invention consists in the construction and novel combination and arrangement of parts hereinafter fully described, illustrated in the accompanying drawings, and pointed out in the claim hereto appended.

In the drawings, Figure 1 is a perspective view of a sliding gate constructed in accordance with this invention and shown open. Fig. 2 is an elevation of the same, the gate being closed. Fig. 3 is a transverse sectional view of the upper portion of the support, illustrating the manner of hanging the gate.

Like numerals of reference indicate corresponding parts in all the figures of the drawings.

1 designates a gate consisting of a frame 2 and wirework connecting the top, bottom, and ends of the frame, and the wirework, which may be of any desired construction, preferably consists of horizontal wires 3, short vertical connecting wires or stays 4, and oppositely-inclined diagonally-bracing wires 5, secured to the frame at the corners thereof and crossing each other at the center of the gate.

The gate is provided at its top with a track-bar 6, secured to the top of the frame of the gate and projecting laterally from opposite sides thereof, and supported upon rollers 7 of a support 8, composed of parallel vertical posts or uprights located at opposite sides of the gate, and a connecting top piece 9, secured to the upper ends of the uprights or posts. The rollers 7 are arranged on the inner faces of the posts of the support and are located near the top thereof, and they enable the gate to slide freely in opening and closing.

The track-bar is provided at the top of the gate and at the back thereof with an upwardly and rearwardly inclined portion 10, located above the plane of the main portion of the track-bar 6, and adapted in opening the gate to lift the same, in order that the gate will ride clear of any obstructions, such as snow or the like. When the gate is closed, it drops to its proper position, and it is provided at its front with a latch 11, arranged to engage a suitable keeper of a latch-post 12.

The gate is provided at its lower front corner with a supporting-roller 13, and the bottom of the gate in opening is supported by a roller 14, journaled in a suitable support 15, and located in rear of the posts or uprights, and adapted to receive and support the gate after it has been elevated by the inclined portion 10 of the track-bar 6.

It will be seen that the gate is simple and inexpensive in construction, that it is adapted to slide freely in opening and closing, and that in opening it is elevated in order to clear obstructions, such as snow and the like.

Changes in the form, proportion, and the minor details of construction may be resorted to without departing from the principle or sacrificing any of the advantages of this invention.

What I claim is—

The combination of a pair of parallel posts provided on their inner faces with rollers, a gate provided at its top with a laterally-projecting track-bar 6, resting upon the rollers and provided adjacent to its rear end with the short inclined portion 10 and having in rear thereof a short horizontal portion located above the plane of the front portion of the track-bar, a roller 13 arranged at the front of the gate, and a short support 15 located in rear of the said posts and provided with a roller and adapted to receive the gate and to maintain the same in an inclined position in opening, substantially as described.

In testimony that I claim the foregoing as my own I have hereto affixed my signature in the presence of two witnesses.

HARRY GROVER.

Witnesses:
GEORGE McKINNIS,
I. A. PULS.